Nov. 18, 1941.  N. MENSHIH  2,263,363
APPARATUS FOR TREATING HYDROCARBONS
Filed July 30, 1938  4 Sheets-Sheet 2

Nicholas Menshih Inventor
By R. L. Young Attorney

Patented Nov. 18, 1941

2,263,363

UNITED STATES PATENT OFFICE 2,263,363

APPARATUS FOR TREATING HYDRO-CARBONS

Nicholas Menshih, Cranford, N. J., assignor to Standard Oil Development Company, a corporation of Delaware Application July 30, 1938, Serial No. 222,163

2 Claims. (Cl. 196—52)

The invention relates to apparatus for the treatment of hydrocarbons and more particularly for the cracking and re-forming of petroleum oils and derivatives of substances containing tar.

A particular problem associated with the catalytic treatment of oils resides in the maintenance of the proper temperature level in the reaction chamber.

As the reaction proceeds, carbonaceous material is deposited in the catalyst making it necessary to discontinue the reaction periodically while the carbonaceous deposit is burned out to regenerate the catalyst. It has been proposed to utilize the heat evolved during the regeneration of the catalyst in one reaction chamber to assist in maintaining the temperature in another reaction chamber at the desired level for the treatment of the hydrocarbons. The arrangements which have been proposed for this purpose, however, have not found acceptance in the art and I believe the reason for this to be that they do not provide for efficient heat transfer between the chamber in which the catalyst is undergoing regeneration and the chamber in which the hydrocarbons are being treated. When separate units are employed, one of which at any given time is on stream and another undergoing regeneration, and it is desired to utilize the heat evolved upon regeneration to maintain the reaction temperature in the one unit, it is necessary to provide auxiliary means for transferring the heat from one unit to the other and to resort to a fluid medium for effecting this transfer. Such a system entails the use of considerable auxiliary apparatus and piping which must be insulated to prevent undue heat loss.

Another proposal which has been made with view to utilizing the heat evolved in burning the carbonaceous material from the spent catalyst is to arrange two catalytic reaction chambers in direct heat-conducting relationship. Such an arrangement is not subject to the disadvantage of requiring the use of a separate heat-conducting medium but presents other disadvantages with respect to heat transfer between the two catalytic masses because of the difficulty of obtaining sufficient area of contact between them.

It is an object of my invention to provide an improved apparatus for effecting heat transfer between catalytic bodies which simultaneously are being regenerated and being used for catalytic reaction. A more specific object is to provide an apparatus of this character in which more effective and complete heat transfer is obtained between a body of catalyst undergoing regeneration and another body which is being used in the catalysis of endothermic reactions.

A further object is to provide apparatus for simultaneous catalysis and regeneration of catalyst within a single unit or chamber and in which a large area of conducting surfaces between the two catalytic bodies therein is made available without the use of projecting fins or baffles.

A further specific object is to provide an apparatus of this character in which a large number of streams of hydrocarbon vapors and of a regenerating medium can be made to flow in heat-conducting relationship through closely adjacent beds of catalytic material in a single reacting unit in conjunction with means for alternating the flow of the streams. Other objects and advantages will appear as the description proceeds.

Apparatus embodying the invention is shown in the accompanying drawings in which.

Figure 1:
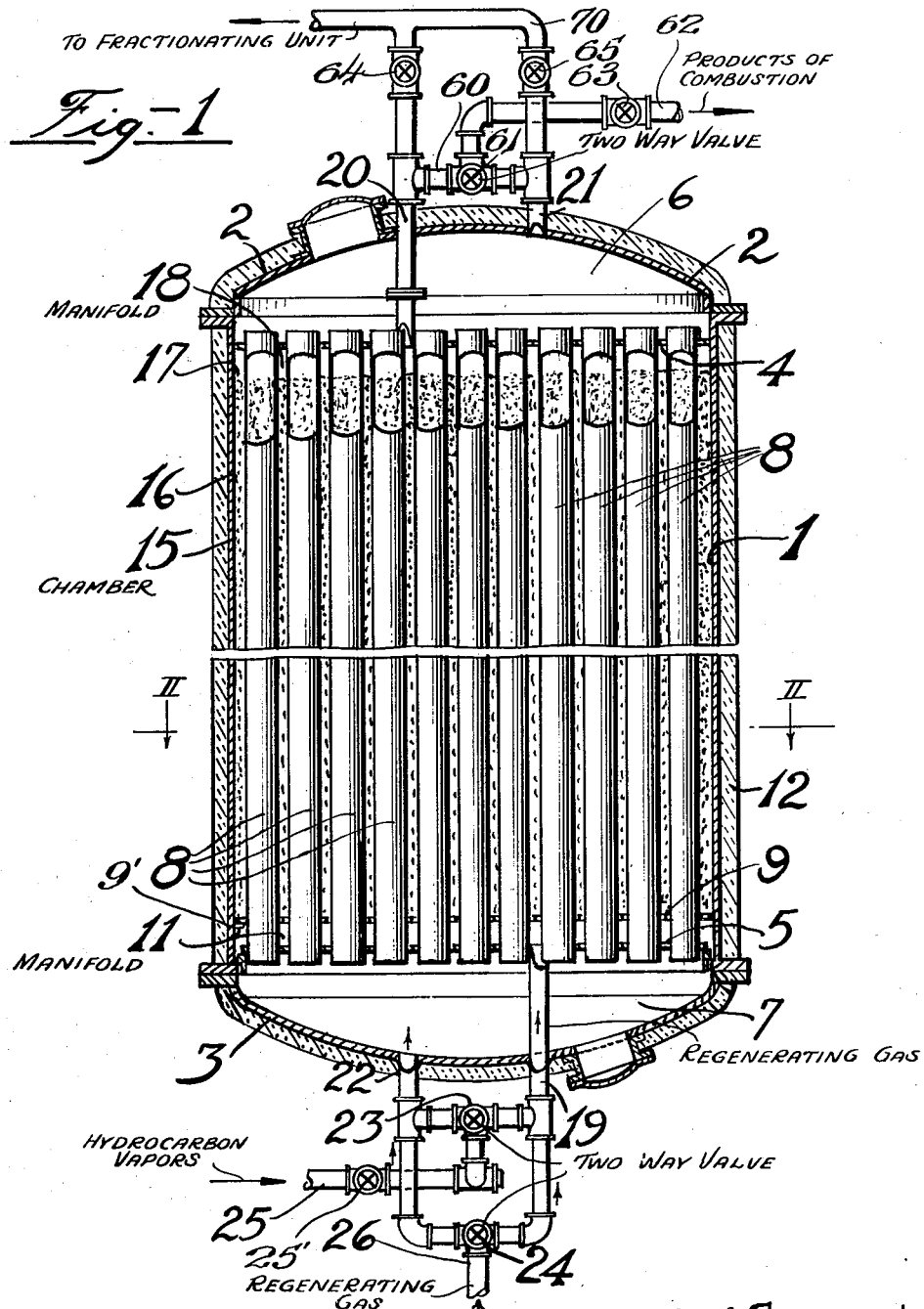
Fig. 1 is a vertical sectional view of the reaction chamber forming a part of my invention.
Figure 2:
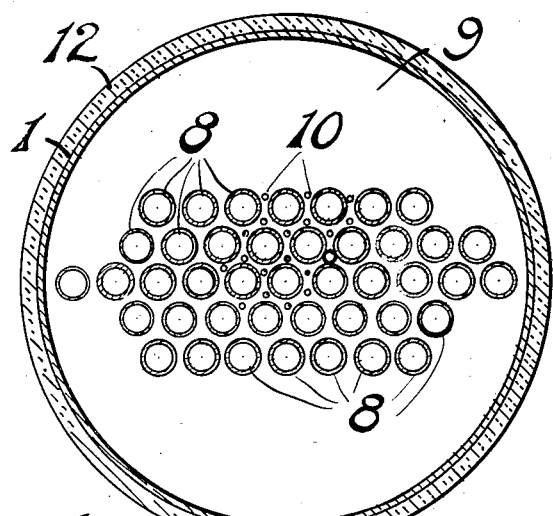
Fig. 2 is a transverse sectional view of the same chamber taken along the line II—II of Fig. 1.

I shall first describe the construction of the reaction chamber shown in Figs. 1 and 2. The chamber there shown is of the cylindrical form ordinarily to be preferred and comprises a cylindrical metal shell 1 closed at its ends by the top and bottom flanged heads 2 and 3 which may be of appropriate dished form as commonly employed in the construction of cracking chambers. Extending across the opposite ends of the enclosed chamber, thus provided, are a pair of transverse walls or partitions 4 and 5. These are arranged near the top and bottom walls of the unit so as to form a pair of chambers 6 and 7 which are arranged to serve as manifolds, as will be described subsequently. The transverse partitions 4 and 5 are provided with a plurality of apertures to receive the longitudinal pipes or conduits 8 which are secured in place in any suitable manner. Just above the lower partition 5 and spaced therefrom by an amount sufficient to provide an adequate gas passage is a removable foraminous plate or screen 9. The pipes 8 extend through this plate, as shown, and the plate is perforated between the openings for the pipes as indicated at 10 in Fig. 2. The space 11 defined by the plates 5 and 9 is adapted to serve as a manifold in the manner subsequently to be described. The outside of the chamber is provided with a covering of insulating material 12.

Figure 3:
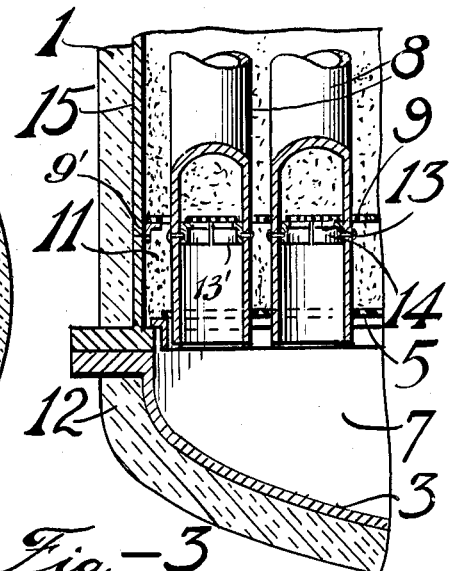
Fig. 3 is a fragmental sectional view showing the means for supporting the catalyst in the tubes and chamber.

Near the lower end of each longitudinal pipe 8 there is inserted a removable foraminous disc 13 (Fig. 3). The perforated plate 9 and discs 13 are removably secured in place in any suitable manner. As shown the plate 9 is supported on a segmental ring 9' which in turn is mounted on an inwardly extending circumferential flange on the interior wall of the chamber. The plate is of a diameter which will clear the flange so that by removing the ring, the plate may be removed from the chamber. The discs 13 in the tubes 8 may be supported in a similar manner by a ring 13'.

The foraminous plate 9 and series of partitions 13 provide a shelf to support the catalytic material which is to be carried within the chamber and pipes. The catalyst chamber 15 between the pipes 8 and above the plate 9 is filled with catalytic material 16 up to the level indicated at 17 which conveniently will be about the same distance below the plate 4 as the plate 9 is above the plate 5 so as to leave a space 18 which is adapted to serve as a manifold as will subsequently be described. Each of the pipes 8 similarly is filled with catalytic material above the partitions 13 up to the same level as that indicated at 17. There are thus provided two beds of catalytic material, one in the chamber 15 and the other consisting of the catalyst within the several pipes 8. The pipes 8 are spaced uniformly throughout the full cross sectional area of the chamber 15 and the number of tubes employed is such that the volume of catalyst contained within the tubes is equal to the volume of catalyst contained in the inner spaces of the chamber between the tubes.

One of the important phases of this invention is the regulation of the size and spacing of the tubes within the chamber to avoid localized overheating of the catalyst mass during the regenerating cycle.

When employing cracking catalysts, such as active or activated hydro silicates of alumina, it is important to avoid excessive temperatures during the regenerating period to prevent loss of activity of the catalyst. For example, it is desirable when regenerating such catalysts to maintain the temperatures below 1100° F. and preferably below 1000° F. In view of the fact that the catalyst mass undergoing regeneration in the apparatus according to the present invention, is surrounded by catalyst mass being subjected to cracking treatment at a temperature of from 800–900° F., the temperature difference between the catalysts undergoing regeneration and that undergoing cracking at the most does not exceed about 300° F. In order, therefore, to avoid local overheating of the catalyst mass undergoing regeneration in that portion of the catalyst most remote from the catalyst engaged in the cracking treatment, it is desirable to employ tubes of a diameter not exceeding 3 inches and preferably 2 inches or less. Likewise, the greatest distance between the tubes should not exceed 3 inches. By employing relatively small diameter tubes and closely spacing the tubes within the catalyst chamber, the heat from the central portion of the tubes or the central sections of the spaces between the tubes passes only a short distance before reaching the catalyst engaged in the cracking stage.

The manifold 11 immediately below the catalyst in the chamber 15 is connected to an alternative source of supply of hydrocarbon feed stock and a regenerating medium by means of a pipe 19 which extends through the end wall 3 and partition 5. At the upper end of the unit, the pipe 20 connects the manifold 18 alternatively with a line 70 leading to a fractionating unit (not shown) and a discharge line for regenerating of gases. Pipes 21 and 22, connecting with the manifolds 6 and 7, likewise provide connections, respectively, to the alternative outlets and the alternative sources of hydrocarbons and regenerating gas. Any suitable means for making the alternative connections may be employed as, for example, the valve arrangement shown at the lower end of the unit in which the pipes 19 and 22 are connected in parallel to the two-way valves 23 and 24, one of which leads to a source of supply of hydrocarbon vapors and the other of which leads to a source of supply of regenerating gas such as air, diluted with steam or combustion gases. In the arrangement shown, the line 25 containing valve 25' may be connected to a pipe still or other source of supply of hydrocarbon vapors, whereas the line 26 may be connected to a source of supply of regenerating gas. It will be understood that the valves and connections just described as applied to the lines 19 and 22 will be used also in conjunction with pipes 20 and 21, or some equivalent connections will be employed in conjunction with the latter. As illustrated a cross line 60 connects lines 20 and 21. A two-way valve 61 controls communication alternatively of lines 20 or 21 with discharge lines 62 having on and off valve 63. An on and off valve 64 is provided in line 20 and an on and off valve 65 is provided in line 21.

The operation of the apparatus I have described, when used for the cracking of petroleum oils, is as follows:

It is considered that the catalyst chamber 15 and pipes 8 have been filled with catalyst in the manner described. The valve 23 is set to connect the pipe 19 with the line 25 which in turn is connected to the source of supply of hydrocarbon vapors to be cracked. The valves 61 and 64 at the upper end of the chamber are set to connect the pipe 20 to apparatus for the separating and fractionating of the cracked vapors into the final end products. Assuming that the catalyst in the pipes 8 contains a carbonaceous deposit from a previous reaction, the valve 24 is set to connect the pipe 22 with the line 26 which in turn is connected to a source of supply of a regenerating medium, and valves 61 and 65 at the upper end of the chamber are set so as to connect pipe 21 through discharge line 62 with the atmosphere or with a heat exchanger. If it is considered that the catalyst in the pipes 8 is fresh, then another source of heat must be supplied in order to maintain the reaction temperature within the chamber 15. When the unit is first being put into operation, it may be found desirable to pass inert heating gases through the pipes 8 during the initial operating stage.

It will now be considered that the valves are set as previously described, that the chamber 15 is in communication with the stream of hydrocarbon vapors, and that the catalyst in the pipes 8 is undergoing regeneration. The hydrocarbon vapors enter through the pipe 19, spread out laterally through the manifold 11 in the interstices between the pipes, pass through the foraminous plate 9 and flow up through the chamber 15 to be collected by the manifold 18 above the top of the catalyst for discharge through the pipe 20. Concurrently, the regenerating medium is conducted through the pipe 22, distributed laterally by the manifold 7, flows upwardly through the fouled catalyst in the several pipes 8, and the products of combustion are collected by the manifold 6 for discharge through the pipe 21 and discharge line 62. When the catalyst in the pipes 8 has been regenerated in this manner and the catalyst in the chamber 15 is ready for regeneration, the valves 23 and 24 are set to reverse the connections so that regeneration proceeds in the chamber 15 and cracking proceeds in the pipes 8, while the valve connections at the discharge end of the reaction chamber likewise are reversed so that the cracked hydrocarbon vapors are carried out through the pipe 21 for further processing and the products of combustion discharged through the pipe 20 and discharge line 62.

Before beginning the active regeneration of the catalyst following the cracking stage, it is desirable to flush the catalyst mass with steam or inert gas to remove oil vapors absorbed on the surface catalyst mass. To this end, after the catalyst has completed the cracking stage, the oil vapors are discontinued and steam is introduced through line 25 to remove the hydrocarbon vapors before operating valves 23 and 24 to change the catalyst from the cracking cycle to the regenerating stage.

Likewise it is desirable at the conclusion of the regenerating cycle to flush the regenerated catalyst to remove regenerated gases absorbed therein. To this end, at the completion of the regenerating stage and before operating the valves to change the regenerated catalyst over to the cracking stage steam may be introduced through line 26.

It should be understood that, if desired, the hydrocarbon feed stock and the regenerating medium may be introduced at the top of the unit and the products withdrawn at the bottom, or the feed stock may be introduced at one end while the regenerating medium is being introduced at the other, all such alternative procedures being comprised within the purview of my invention.

In carrying out the process described, the rapid absorption of heat by the portion of the unit which is on stream from the portion which is on regeneration makes possible the use of higher concentrations of oxygen in the regenerating gas, and consequently more rapid and thorough regeneration without de-activation of the catalyst. The lower temperature of regeneration under these conditions tends to increase the life of the catalyst. Furthermore, it is easier to maintain constant temperatures during cracking by reason of the constant and well distributed supply of heat from the portion of the unit which is undergoing regeneration.

In order to maintain the desired heat balance between the regenerating and cracking portions of the unit, the pressure in the regenerating chamber may be raised or lowered as required. This changes the ratio of the heat produced by regeneration to the volume of the hydrocarbon gases passing through the cracking chamber in unit time. Another means which can be employed to maintain the desired heat balance is to adjust the oxygen concentration of the regenerating gases. Thus it will be seen that if the oxygen concentration is increased the temperature in the reacting portion of the unit will be increased, and vice versa. Other means of maintaining the heat balance may be employed as will be apparent to those skilled in the art. For example, separate means for heating or cooling one portion of the unit may be employed.

Figure 4:
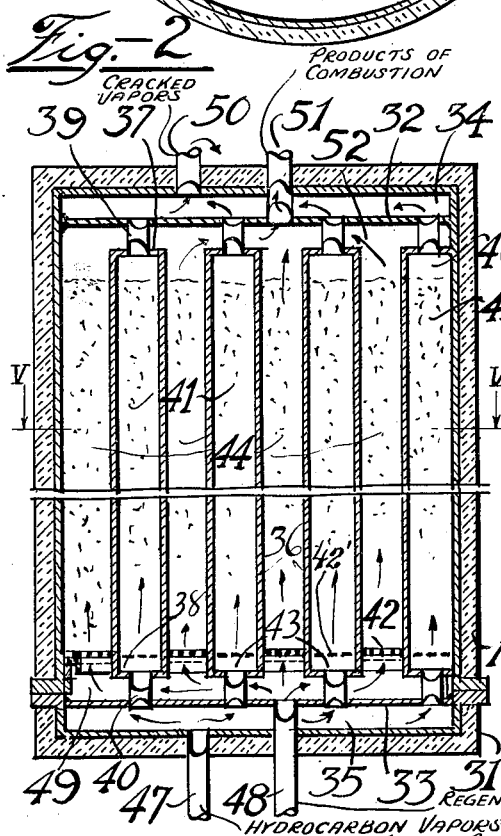
Fig. 4 is a vertical sectional view of a modified form of reaction chamber.
Figure 5:
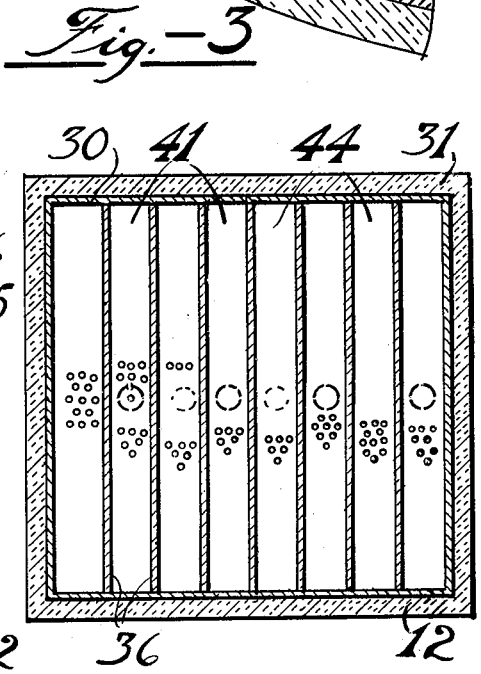
Fig. 5 is a transverse sectional view taken along the line V—V of Fig. 4.

I shall now describe the embodiment illustrated in Figs. 4 and 5 of the drawings. In this modified construction the unit is rectangular in transverse section (Fig. 5) comprising a metal shell 30 lagged with a layer of insulation 31. Transverse partitions 32 and 33 near the upper and lower extremities of the unit provide manifolds 34 and 35 respectively, corresponding in purpose to the manifolds 6 and 7 of the construction described in connection with Figs. 1 to 3. A series of vertical plates 36 extending from side to side of the unit, and arranged in parallelism, provide conduits for the parallel streams of regenerating gas and hydrocarbon vapors which are to be passed through the unit. The partitions 36 preferably are terminated short of the transverse plates 32 and 33 and are connected together in pairs by the end walls 37, 38, leaving a passage between the end walls and the plates 32 and 33. A series of pipes or other conduits 39, 40 are arranged in communication with apertures in the end plates 32 and 33 respectively whereby the alternate chambers 41 are connected to the manifolds 34 and 35. A foraminous partition or partitions 42' in chamber 41, forming a shelf for the catalytic material, extends transversely of the unit above the end walls 38 of the chambers 41, providing a set of secondary manifolds 43. The set of catalyst chambers 41 and the alternate set of catalyst chambers 44 are filled with catalytic material up to the level indicated at 45, leaving a space 46 between the top of the bed and the end walls 37. There is thus provided a series of secondary manifolds corresponding to the manifolds 43 at the lower end of the chamber. A pipe 47 is arranged in communication with the manifold 35 and a pipe 48 in communication with the manifold 49 provided between the foraminous plate 42 and transverse partition 33. Pipes 50 and 51 are similarly arranged in communication with the manifolds 34 and 52 respectively. The pipes 47 and 48 are connected to alternate sources of supply of hydrocarbon feed stock and regenerating gases as, for example, by means of the connections described with reference to the embodiment of Figs. 1 to 3, and pipes 50 and 51 are arranged for alternate connection to processing units and to a discharge line for burned hydrocarbons.

The operation of the apparatus illustrated in Figs. 4 and 5 is similar to that described with reference to the embodiment of Figs. 1 to 3. It will be observed that the gases entering through the pipe 47 spread out laterally through the manifold 35, pass up through the pipes 40, laterally through the manifolds 43, up through the chambers 41, manifolds 46 and pipes 39 to be collected by the manifold 34 for discharge through pipe 50. Gases entering through the pipe 48 spread out laterally through the manifold 49 (passing around the pipes 40), pass upwardly through the chambers 44 to be collected by the manifold 52

(passing around the pipes 39) for discharge through the pipe 51.

With the arrangement just described, the ratio between the volume of catalyst in the passages 41 and the area of contact between the catalyst and the walls of said passages is exactly the same as the ratio between the volume of the catalyst in the passages 44 and the area of contact between the catalyst therein and the walls of said passages. The other advantages enumerated with respect to the embodiment previously described are also obtained with the form of apparatus.

Figure 6:
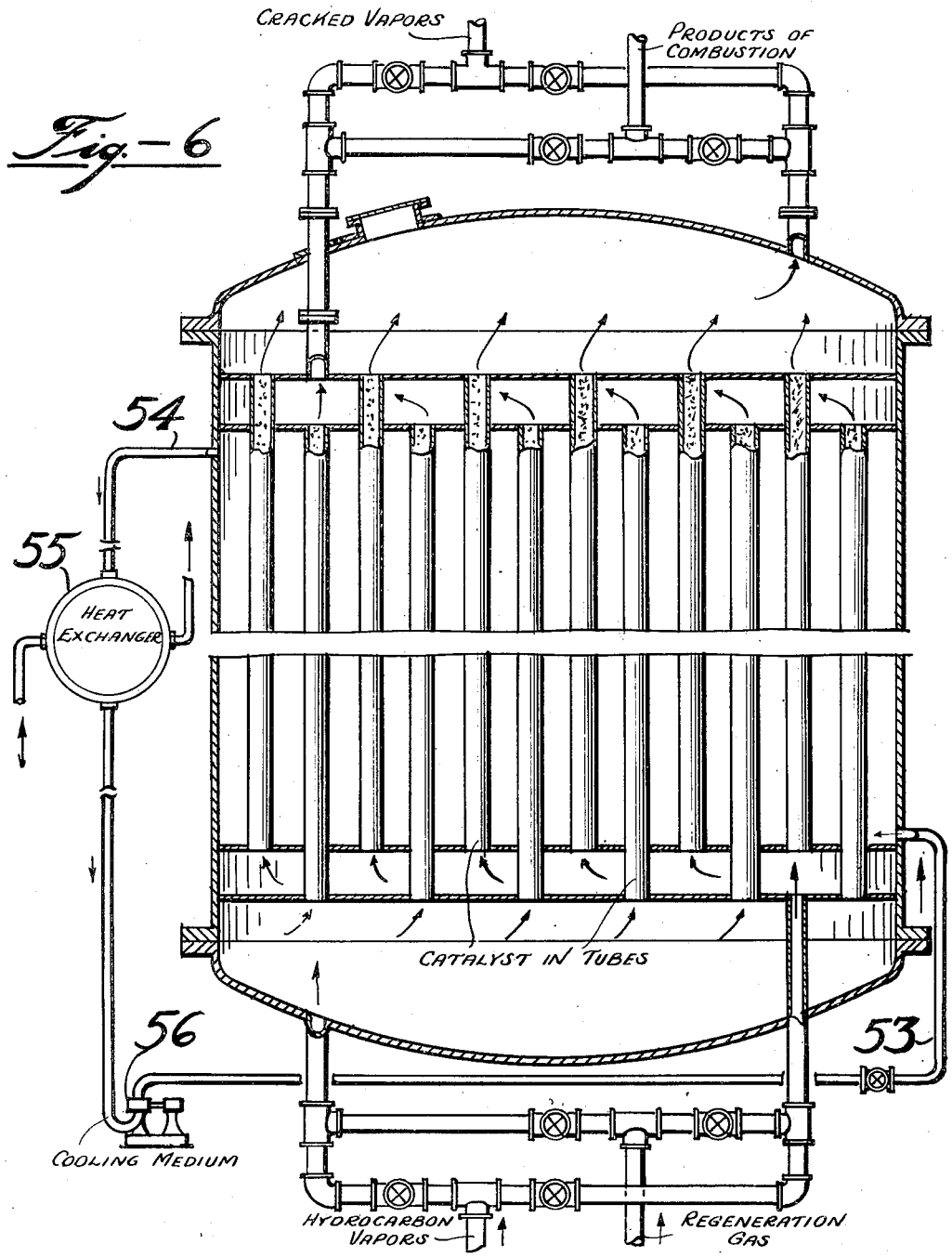
Fig. 6 is a transverse sectional view of a further modification of the reaction chamber.

Fig. 6 illustrates a further modification of my invention. According to this modification, in lieu of filling the space between the separate tubes with catalyst as shown in Fig. 1, a cooling medium is circulated through this space. As here shown, the alternate tubes within the reaction chamber are interconnected with the regenerating circuit and/or the cracking circuit so that when any one of the tubes are undergoing regeneration, the tubes immediately adjacent thereof are in the cracking circuit.

A heat transfer medium which may be a molten metal or molten salt, is introduced to the space surrounding the tubes through line 53 and after circulating through the reaction chamber is withdrawn through line 54 provided with a heat exchanger 55 for introducing or removing heat to or from the heat transfer medium. The heat transfer medium after having the temperature adjusted the required amount by means of the heat exchanger is recirculated to the reaction chamber by means of pump 56. This modification permits more uniform temperature during the cracking operation throughout the full length and cross sectional area of the tubes in the cracking circuit. It also provides a means for introducing or removing heat from the unit, thus making it unnecessary to carefully regulate the regeneration so that the heat liberated thereby is just sufficient to accomplish the cracking process.

Figure 7:
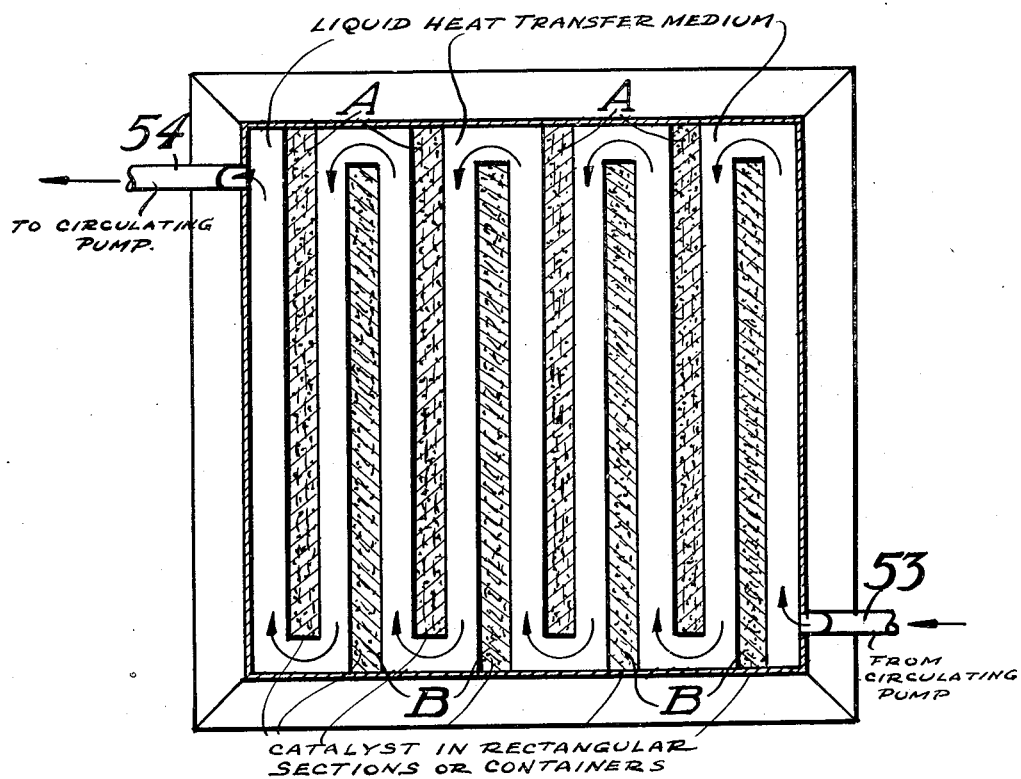
Fig. 7 is a transverse sectional view of still another modified form of the reaction chamber.

Fig. 7 illustrates a further modification similar to Fig. 6 except in the following respects. In Fig. 7, the catalyst rather than being supported in tubular conduits is disposed in rectangular spaced sections within the reaction chamber, the alternate sections being interconnected with the regenerating circuit and the cracking circuit respectively. That is to say, the conduits indicated by A are in on-stream or cracking operation while those indicated by B are connected with the regeneration circuit and vice versa. Moreover, the rectangular sections within the reaction chamber serve as baffles for the heat exchange medium so as to require the latter to pass alternately back and forth around the sections before being withdrawn from the reaction zone. This modification has a further advantage over the apparatus illustrated in Fig. 6 in that the amount of pressure necessary to force the gases through the catalyst is less than in the case where small diameter tubes are employed as illustrated in Fig. 6.

Numerous other variations in the form of the apparatus can be made without departing from the invention and without sacrificing the principal advantages thereof. Such changes will be obvious to those skilled in the art of petroleum cracking and related processes. The terms and expressions which I have employed are used as terms of description and not of limitation, and I have no intention of excluding any equivalents of the invention set forth, or of portions thereof.

I claim:

1. In apparatus for the treatment of hydrocarbons, a cracking and regenerating chamber, a plurality of closely spaced parallel pipes within said chamber, the cross-sectional area enclosed by said pipes being substantially equal to the cross-sectional area therebetween, a header connecting one end of each of said pipes with an alternate source of supply of hydrocarbons and regenerating gas, a header connecting the other end of each of said pipes alternately in cracking and regenerating stages, a header connecting the spaces between said pipes at one end of said chamber alternately with a source of supply of hydrocarbons and regenerating gas, and a header connecting the spaces between said pipes at the other end of said chamber alternately in cracking and regenerating stages.

2. In apparatus for the treatment of hydrocarbons a cracking and regenerating chamber, a plurality of closely spaced parallel pipes within said chamber, a header connecting one end of each of said pipes with an alternate source of supply of hydrocarbons and regenerating gas, a header connecting the other end of each of said pipes alternately in cracking and regenerating stages, a header connecting the space between said pipes at one end of said chamber alternately with a source of supply of hydrocarbons and regenerating gas, a header connecting the spaces between said pipes at the other end of said chamber alternately in cracking and regenerating stages, the combined volume of the spaces enclosed by said pipes between said headers being substantially equal to the volume of the space between said pipes and said headers within said chamber.

NICHOLAS MENSHIH.